United States Patent
Liang

(10) Patent No.: US 6,185,994 B1
(45) Date of Patent: Feb. 13, 2001

(54) OIL LEVEL DETECTOR FOR DETECTING THE OIL LEVEL IN THE OIL TANK OF A VEHICLE

(76) Inventor: Chung-Ho Liang, 2/F., No. 66, Sec. 3, Cheng-Tai Rd., Wu-Ku Village, Taipei County (TW)

(*) Notice: Under 35 U.S.C. 154(b), the term of this patent shall be extended for 0 days.

(21) Appl. No.: 09/212,301

(22) Filed: Dec. 16, 1998

(51) Int. Cl.$^7$ .................................................. G01L 3/26
(52) U.S. Cl. .................................................. 73/116; 73/313
(58) Field of Search ..................... 73/313, 319, DIG. 5, 73/116

(56) References Cited

U.S. PATENT DOCUMENTS

| | | | |
|---|---|---|---|
| 2,473,581 | * 6/1949 | Ford | D16/5 |
| 5,097,976 | * 3/1992 | Zink et al. | 220/244 |
| 5,862,702 | * 1/1999 | Liang | 73/313 |

FOREIGN PATENT DOCUMENTS

1563100 * 12/1968 (FR) ................................. 73/DIG. 5

* cited by examiner

Primary Examiner—Benjamin R. Fuller
Assistant Examiner—Maurice Stevens
(74) Attorney, Agent, or Firm—Rosenberg, Klein & Lee

(57) ABSTRACT

An oil level detector includes a circular holder base installed in an oil tank of a vehicle to hold an insulative sleeve in a bottom tube thereof, a float floating with the level of oil along the bottom tube, and a circuit board mounted in the insulative sleeve to detect the elevation of the float, wherein the tube which holds the insulative sleeve inside the holder base is an anticorrosive close-end tube; the insulative sleeve has both ends sealed with a respective sealing cap, the sealing cap which seals the top end of the sleeve being forced into tight engagement with the inner diameter of the tube when the sleeve is installed in the tube, causing the top end of the tube to be water-tightly sealed.

2 Claims, 4 Drawing Sheets

OIL LEVEL DETECTOR FOR DETECTING THE OIL LEVEL IN THE OIL TANK OF A VEHICLE

BACKGROUND OF THE INVENTION

The present invention relates to an oil level detector for use in an oil tank of a vehicle to detect the level of oil, and more particularly to such an oil level detector which has means to effectively prohibit oil from passing to its inside.

FIG. 4 illustrates an oil level detector according to the prior art. This structure of oil level detector comprises a flat, circular holder base 5 having a tube 52 at the bottom side and a top block 51 at the top side, a top cover 6 covered on the top block 51, a float 53 mounted around and moved vertically along the tube 52, a detecting circuit board 8 mounted in the bore 521 of the tube 52, and a screw cap 7 mounted with a rubber ring 71 and threaded into the inner thread 522 at the bottom end of the tube 52. The lead wires 81 of the detecting circuit board 8 are extended out of a hole 511 at the top block 51 and a hole 61 at the top cover 6, and connected to power source. This structure of oil level detector is still not satisfactory in function. Because oil may permeate through the gaps between the inner thread 522 of the tube 52 and the threaded periphery of the screw cap 7, the detecting circuit board 8 tends to be damaged by oil leaked in the tube 52. Further gas or moisture may permeate through the holes 61,511 to the inside of the tube 52 to damage the detecting circuit board 8. There is known a similar oil level detector in which the tube which holds the detecting circuit board on the inside is a close-end tube directly injection-molded from plastics. Because the bottom end of the tube is a closed end, oil is prohibited from leaking in the tube. However, the plastic material property of the tube will be damaged a certain period of time after dipping in oil, causing oil to leak in the tube through damaged structure of the tube.

SUMMARY OF THE INVENTION

The present invention has been accomplished to provide an oil level detector which eliminates the aforesaid problems. According to one aspect of the present invention, an insulative sleeve is mounted in the tube of the holder base with both ends well sealed by a respective sealing cap to hold the detecting circuit board on the inside, and the tube which holds the insulative sleeve inside the holder base is an anticorrosive close-end tube. According to another aspect of the present invention, the sealing cap which seals the top end of the sleeve is forced into tight engagement with the inner diameter of the tube when the sleeve is installed in the tube, causing the top end of the tube to be water-proof.

DETAILED DESCRIPTION OF THE PREFERRED EMBODIMENT

Figure 1:
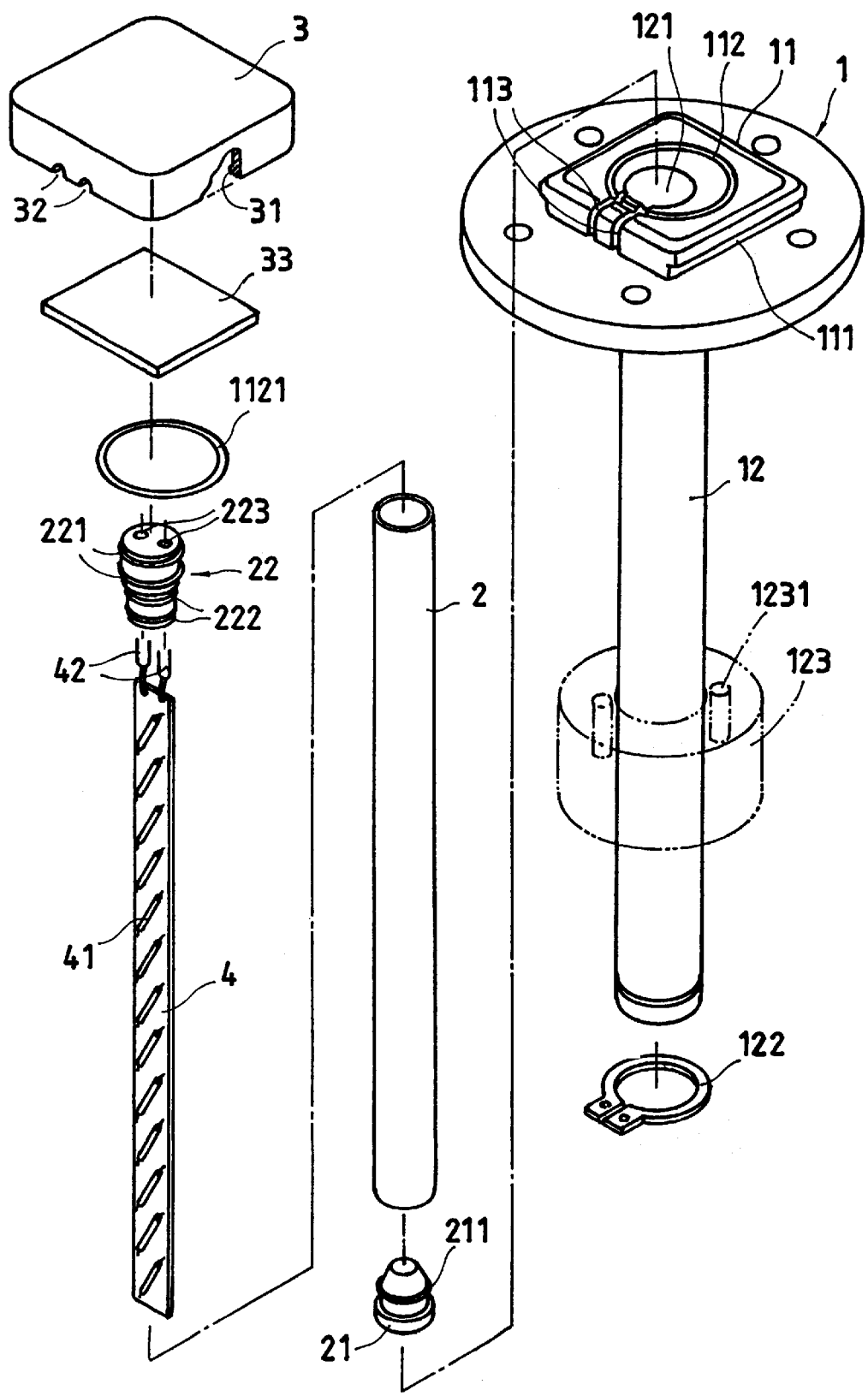
FIG. 1 is an exploded view of an oil level detector according to the present invention.
Figure 2:
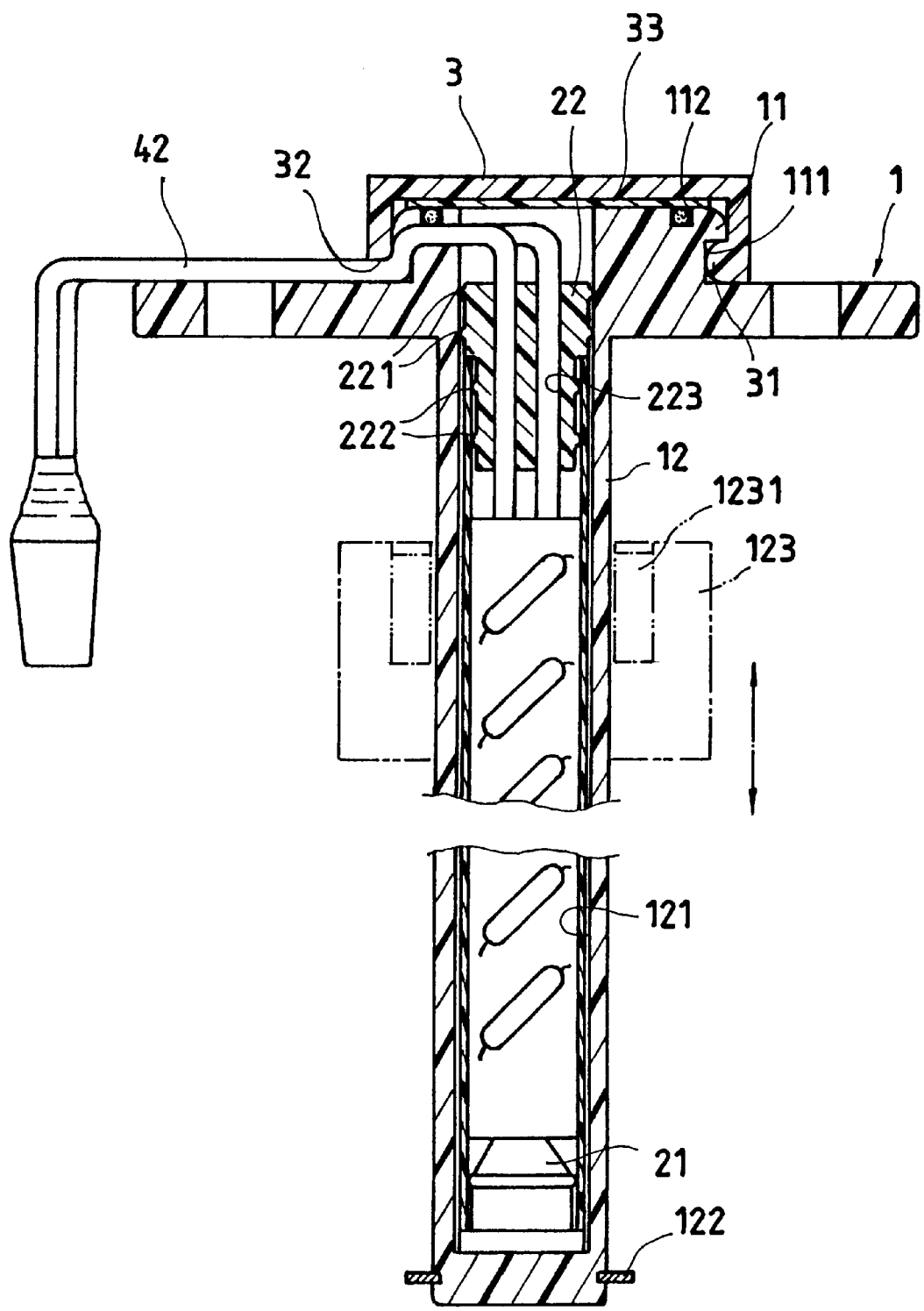
FIG. 2 is a sectional assembly view of the oil level detector shown in FIG. 1.

Referring to FIGS. 1 and 2, a flat, circular holder base 1 is shown having a close-end tube 12 downwardly perpendicularly extended from the bottom side wall thereof, and a flat block 11 raised from the top side wall thereof. The flat block 11 comprises a center through hole 121 in communication with the inside space of the close-end tube 12, an annular groove 112 at the top side wall thereof around the center through hole 121, two wire grooves 113 respectively extended from the annular groove 112 to one peripheral side thereof, and two peripheral coupling grooves 111 respectively provided at two opposite peripheral sides thereof. The close-end tube 12 has an opened top end integral with the bottom side wall of the circular holder base 1 around the bottom end of the center through hole 121 at the flat block 11. A clamp 122 is fastened to the close-end tube 12 near its closed bottom end. An annular float 123 is mounted around the close-end tube 12, and moved up and down along the close-end tube 12 between the circular holder base 1 and the clamp 122. The annular float 123 holds a plurality of magnets 1231 on the inside. An insulative sleeve 2 is mounted inside the close-end tube 12 to hold a detecting circuit board 4. A first plug cap 21 and a second plug cap 22 are respectively fastened to the bottom and top ends of the sleeve 2 to prevent a water leakage. The first plug cap 21 has a plurality of outside annular flanges 211 raised around the periphery and press-fitted into the bottom end of the insulative sleeve 2. The second plug cap 22 has a plurality of outside annular flanges 221 and 222 raised around the periphery of the stepped plug portion thereof, and two axially extended wire holes 223. The outside annular flanges 222 at the thinner lower end of the stepped plug portion of the second plug cap 22 are press-fitted into the top end of the insulative sleeve 2. The detecting circuit board 4 is mounted inside the insulative sleeve 2, having a plurality of vertically spaced solenoid elements 41 for reaction with the magnets 1231 at the annular float 123, and two lead wires 42 extended out of the wire holes 223 at the second plug cap 22. After installation of the detecting circuit board 4 in the insulative sleeve 2, the insulative sleeve 2 is inserted with the plug caps 21 and 22 through the center through hole 121 into the inside of the close-end tube 12, enabling the outside annular flanges 221 at the thicker upper end of the stepped plug portion of the second plug cap 22 to be press-fitted into the center through hole 121. After installation of the insulative sleeve 2 in the close-end tube 12, the lead wires 42 are arranged in the wire grooves 113 at the flat block 11 and connected to power source. A rubber ring 1121 is mounted in the annular groove 112 around the center through hole 121. A rubber pad 33 is covered on the flat block 11 over the rubber ring 1121. A cover 3 is covered on the flat block 11 to hold down the rubber pad 33 and the rubber ring 1121. The cover 3 has two inward coupling flanges 31 disposed at two opposite peripheral sides thereof and respectively forced into engagement with the peripheral coupling grooves 111 at the flat block 11, and two wire holes 32 through which the lead wires 42 pass.

Figure 3:
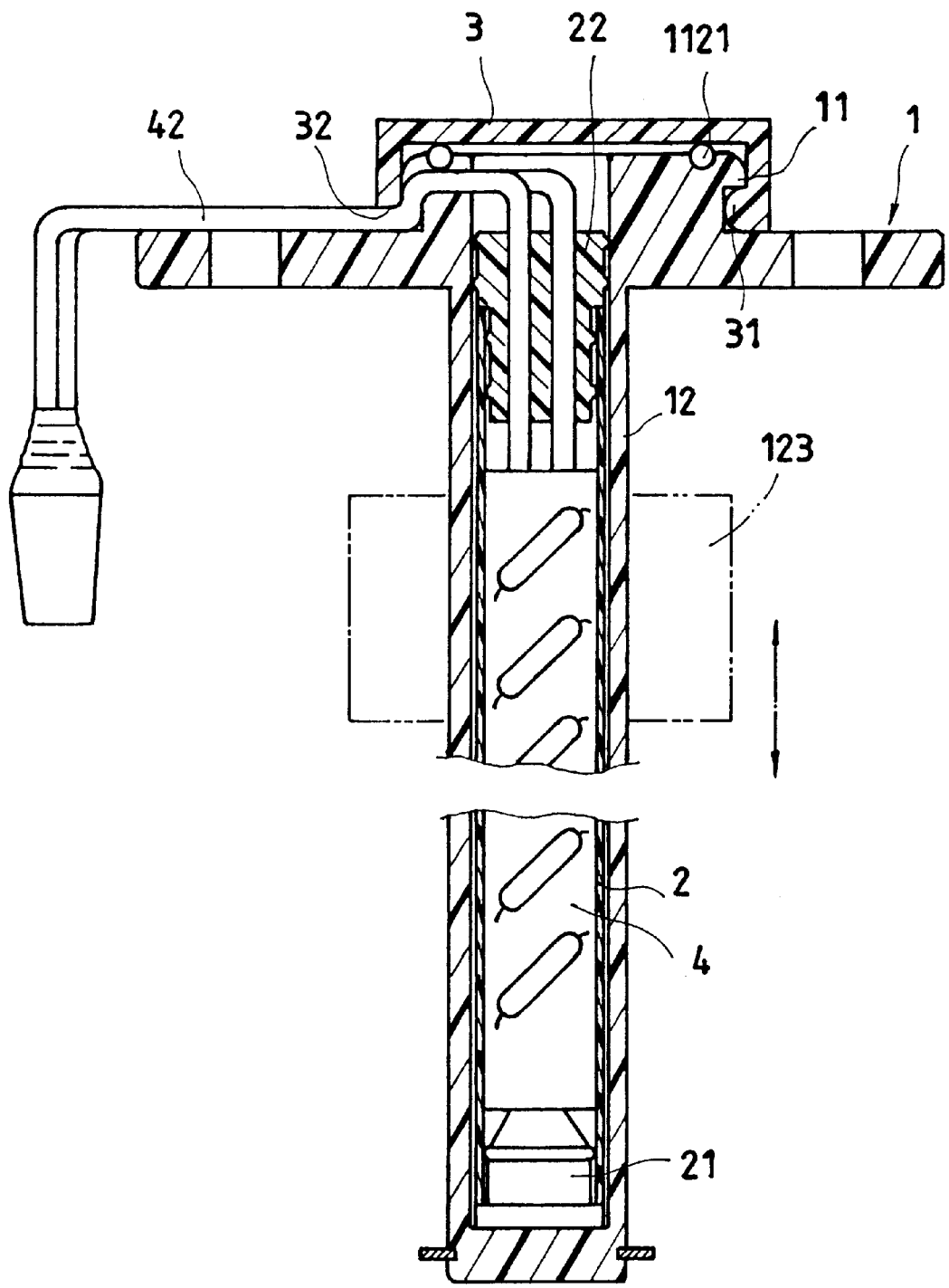
FIG. 3 is a sectional assembly view of an alternate form of the oil level detector according to the present invention.
Figure 4:
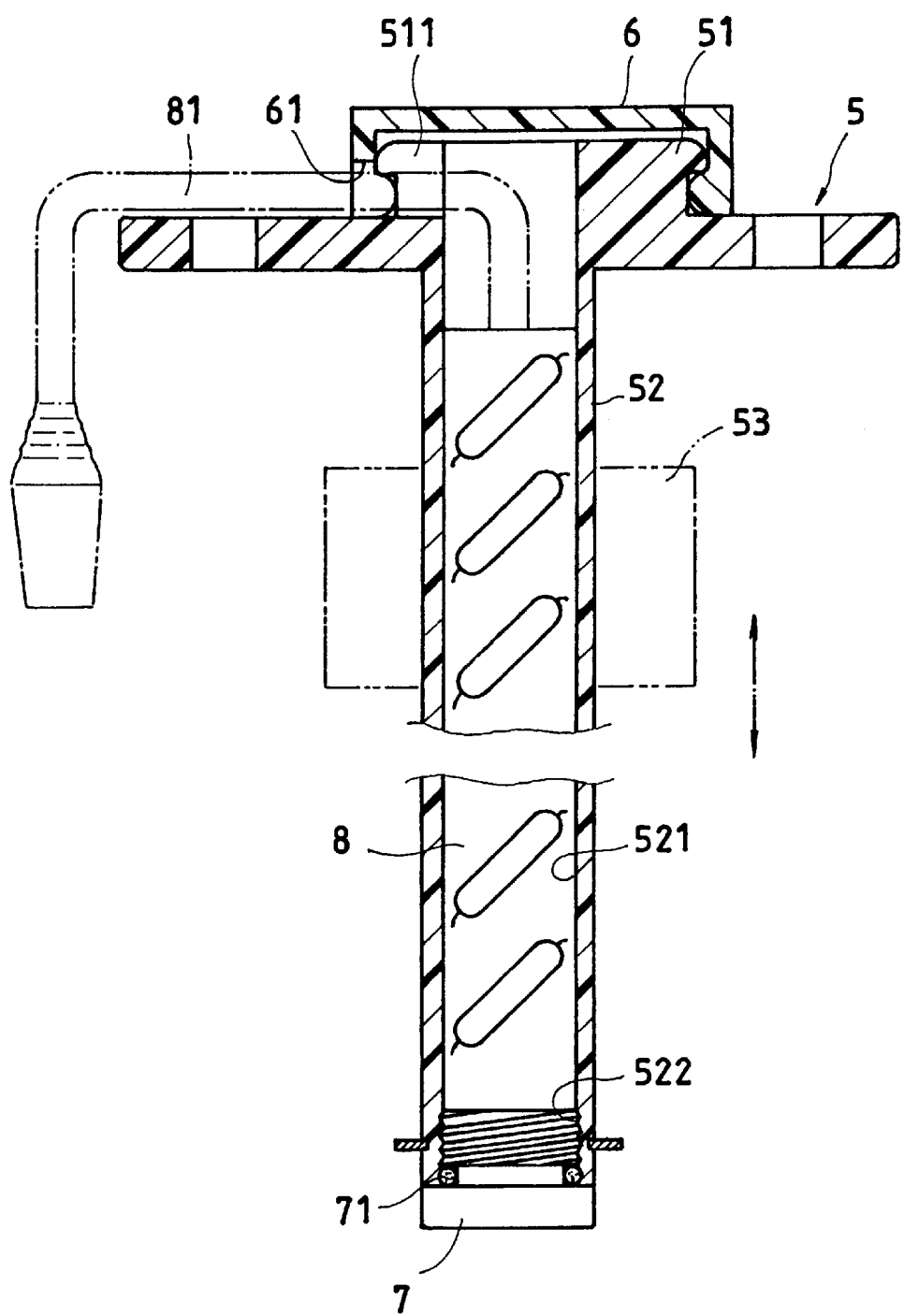
FIG. 4 is a sectional view of an oil level detector according to the prior art.

FIG. 3 shows an alternative form of the present invention. According to this alternate form, the aforesaid rubber pad 33 is eliminated, and the rubber ring 1121 is directly held down by the cover 3 to seal the gap.

It is to be understood that the drawings are designed for illustration only, and are not intended as a definition or limitations of the scope of the invention disclosed.

What is claimed is:

1. A oil level detector installed in an oil tank to detect the level of oil, comprising:

a flat, circular holder base, said holder base comprising a bottom side wall, a top side wall and a closed-end tube having an interior extending downwardly from said bottom side wall substantially perpendicularly to said bottom side wall, and a flat block having a first, second, third and fourth peripheral side raised from said top side wall of said holder base, said flat block comprising a central through hole formed to be in communication with said interior of said closes-end tube, an annular groove formed at said top side wall of said flit block, said annular groove extending around said central through hole, two wire grooves respectively extended from said annular groove towards and along said first peripheral side of said flat block, and two peripheral coupling grooves, each formed at a respective one of said third and fourth opposite peripheral side of said flat block;

a clamp fastened to said closed-end tube at an end remote from said holder base;

an annular float mounted around said closed-end tube and movable in opposing directions along said closed-end tube between said circular holder base and said clamp, said annular float holding a plurality of magnets mounted interior thereto;

an insulative sleeve mounted inside of said closed-end tube, said insulative sleeve having a bottom end and a top end;

a first plug cap and a second plug cap respectively fastened to the bottom end and top end of said insulative sleeve in press-fit engagement therewith to prevent an oil leakage, said first plug cap having a periphery and a plurality of outside annular flanges raised around the periphery thereof and press-fit into the bottom end of said insulative sleeve, said second plug cap having a plurality of first outside annular flanges press-fit into the top end of said insulative sleeve, a plurality of second outside annular flanges press-fit into said central through hole at said flat block, and a plurality of axially extended wire holes;

a rubber ring mounted in said annular groove around said central through hole of said flat block;

a cover mounted on said flat block to hold down said rubber ring, said cover having peripheral side walls and comprising two inwardly extending coupling flanges disposed at two opposite peripheral said side walls thereof and respectively forced into engagement with said peripheral coupling grooves at said flat block, and a plurality of wire holes formed in a respective peripheral side wall of said cover and attached to the wire grooves formed at said flat block; and a detecting circuit board mounted within said insulative sleeve, said detecting circuit board being substantially completely enveloped by said insulative sleeve, said detecting circuit board comprising a plurality of vertically spaced solenoid elements for interaction with the magnets mounted in said annular float, and a plurality of lead wires respectively extended from said detecting circuit board through said wire holes formed in said second plug cap, the wire grooves formed in said flat block, and the wire holes formed in said cover.

2. The oil level detector of claim 1, further comprising a rubber pad positioned on the top of said flat block over said rubber ring and held down by said cover.

\* \* \* \* \*